United States Patent [19]

Park et al.

[11] Patent Number: 4,535,094
[45] Date of Patent: Aug. 13, 1985

[54] ALKENYL AROMATIC MONOMER OLEFINICALLY UNSATURATED ACID FOAMS AND METHOD FOR THE PREPARATION THEREOF

[75] Inventors: Chung P. Park, Pickerington; Kyung W. Suh, Granville, both of Ohio

[73] Assignee: The Dow Chemical Company, Midland, Mich.

[21] Appl. No.: 588,469

[22] Filed: Mar. 12, 1984

Related U.S. Application Data

[63] Continuation of Ser. No. 490,107, Apr. 29, 1983, abandoned, which is a continuation of Ser. No. 376,458, May 10, 1982, abandoned, which is a continuation of Ser. No. 224,427, Jan. 21, 1981, abandoned, which is a continuation-in-part of Ser. No. 141,541, Apr. 18, 1980, abandoned.

[51] Int. Cl.$^3$ ............................................. C08J 9/08
[52] U.S. Cl. ......................................... 521/79; 264/54; 521/92; 521/94; 521/97; 521/147
[58] Field of Search ............... 521/79, 92, 94, 147; 264/54

[56] References Cited

U.S. PATENT DOCUMENTS

| | | | |
|---|---|---|---|
| 3,200,176 | 8/1965 | Baxter | 521/79 |
| 3,344,092 | 9/1967 | Pavuk | 521/79 |
| 3,406,230 | 10/1968 | Baxter et al. | 521/79 |
| 3,547,838 | 12/1970 | Moore et al. | 521/79 |
| 3,867,319 | 2/1975 | Lundberg | 521/139 |
| 3,962,154 | 6/1976 | Elgi | 521/79 |
| 4,298,702 | 11/1981 | Hahn et al. | 521/79 |
| 4,306,036 | 12/1981 | Corbett | 521/79 |
| 4,307,202 | 12/1981 | Corbett | 521/79 |
| 4,312,910 | 1/1982 | Suh | 521/79 |

FOREIGN PATENT DOCUMENTS

| | | |
|---|---|---|
| 844652 | 6/1970 | Canada . |
| 1058376 | 2/1967 | United Kingdom . |
| 1454579 | 11/1976 | United Kingdom . |

*Primary Examiner*—Morton Foelak
*Attorney, Agent, or Firm*—R. B. Ingraham

[57] ABSTRACT

Highly desirable alkenylaromatic monomer olefinically unsaturated acid foams are prepared by extrusion using as a blowing agent inorganic compounds such as sodium bicarbonate, either alone or in combination with volatile fluid foaming agents.

3 Claims, No Drawings

ALKENYL AROMATIC MONOMER OLEFINICALLY UNSATURATED ACID FOAMS AND METHOD FOR THE PREPARATION THEREOF

CROSS REFERENCE TO RELATED APPLICATION

This is a continuation of application Ser. No. 490,107 filed 4/29/83, now abandoned; which is a continuation of Ser. No. 376,458 filed 5/10/82, now abandoned; which is a continuation of Ser. No. 224,427 filed 1/21/81, abandoned; which is a continuation-in-part of Ser. No. 141,541 filed 4/18/80, abandoned.

Extruded plastic foams have become important items of commerce utilized as thermal insulation and decoration. One of the more popular extruded plastic foams is polystyrene foam. It has been recognized that it would be desirable to have improved styrene polymer foam having a higher heat distortion temperature, greater solvent resistance and having a wider latitude in preparation. Extruded alkenyl aromatic polymer foams generally are prepared using substantial quantities of halocarbons as volatile fluid foaming agents. Depending on the particular volatile fluid foaming agent or mixture employed, the halocarbon will sooner or later diffuse from the foam and enter the atmosphere. There has been considerable semiscientific speculation as to the long term effects of such halogens being released into the atmosphere. In view of the current energy crisis, larger and larger volumes of extruded plastic foam and thermal insulation will be desired and required. One convenient solution to the halo-hydrocarbon problem would be to employ carbon dioxide as a blowing agent. However, certain technical drawbacks exist which make the use of carbon dioxide as a blowing agent undesirable.

It would be desirable if there were available an improved alkenyl aromatic polymer foam suitable for thermal insulation and decoration.

It would be desirable if there were available an improved process for the preparation of alkenyl aromatic polymer foams which minimized the amount of halohydrocarbons released into the atmosphere.

It would also be desirable if there were available an improved process for the preparation of alkenyl aromatic polymer foams which permitted an increase in latitude in the operating conditions.

These benefits and other advantages in accordance with the present invention are achieved in an improved alkenyl aromatic polymer foam, the foam having a density of from about 0.5 to 8 pounds per cubic foot, the foam having a synthetic resinous thermoplastic body comprised of a polymer having a weight average molecular weight of from about 100,000 to about 350,000 gram moles, the polymer having polymerized therein from about 99 to 70 parts by weight of an alkenyl aromatic monomer and from about 1 to 30 parts by weight of an olefinically unsaturated acid selected from the group consisting of acrylic acid, methacrylic acid, itaconic acid and mixtures thereof, the body defining a plurality of closed gas filled cells, the foam body having an ion therein, the ion being selected from a group consisting of sodium, magnesium, zinc, ammonium and mixtures thereof.

Synthetic resinous thermoplastic foams suitable for the practice of the present invention are polymers containing polymers thereof alkenyl aromatic monomer and olefinically unsaturated acid wherein the alkenyl aromatic monomer is present in the proportion of from about 99 to 70 parts by weight and the acid is present in a proportion of from about 1 to 30 parts by weight. Preferable for most applications, the alkenyl aromatic monomer is present in a proportion of from about 95 parts by weight to 80 parts by weight while the acid is present in a proportion of from about 5 to 20 parts by weight. Advantageously, the weight average molecular weight of the alkenyl aromatic monomer and olefinically unsaturated acid containing polymer is from about 100,000 to 350,000 gram moles as determined by gel permeation chromatography, and preferably from about 150,000 to 300,000 gram moles.

By the term "alkenyl aromatic monomer" is meant an alkenyl aromatic compound having the general formula

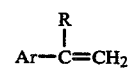

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene and the like.

In the preparation of foams in accordance with the present invention, the copolymers employed need not be limited only to two monomers such as styrene and acrylic acid. A portion of the styrene may readily be replaced with alkyl styrenes such as methylstyrene, t-butylstyrene, bromostyrene, chlorostyrene and the like; as well as acrylonitrile, methacrylonitrile, methylmethacrylate in a proportion generally up to about 20 weight percent of the total polymer. The acrylic acid portion may be wholly or partially replaced with methacrylic acid, itaconic acid and the like.

Blowing agents useful in the practice of the present invention include sodium bicarbonate, magnesium carbonate, ammonium carbonate, and zinc carbonate in a proportion of 0.5 to 20 parts by weight per hundred parts by weight of polymer, and combinations of sodium bicarbonate with sodium methoxide with hydrocarbons or fluorocarbons.

Also useful in the practice of the present invention are sodium carbonate monohydrate, zinc acetate dihydrate, zinc carbonate, ammonium carbonate, magnesium carbonate hydrates including basic magnesium carbonates. Such foaming agents again may be used alone or in combination with hydrocarbons or fluorocarbons. Suitable volatile fluid foaming agents are well known in the art.

Desirably the density of the foam in accordance with the invention is from about 0.5 to about 8 pounds per cubic foot and preferably in the range of about 1 to 5 pounds per cubic foot. Desirably the cell size of the foam is from about 0.1 to about 5 millimeters and advantageously from about 0.1 to about 2.5 millimeters.

Suitable styrene-acrylic acid copolymers for the practice of the present invention are provided by a coil polymerization technique set forth in U.S. Pat. No. 3,035,033 to W. K. Schweitzer, the teaching of which is incorporated by reference thereto. A like procedure can be used to prepare other copolymers for the practice of the present invention.

Generally, preparation of foam in accordance with the present invention is accomplished by intimately admixing particulate resin with the desired particulate blowing agent, for example a styrene-acrylic acid resin having a particle diameter of about 0.1 inch and powdered sodium bicarbonate. In order to provide uniform admixture it is often desirable to apply to the resin an adhering aid such as a 1:1 by weight mixture of dibutylphthalate and alphamethylstyrene. Usually, the particulate resin if the resin is placed into a suitable dry blender, the adhering aid added, the material tumbled for a length of time generally known only to those familiar with the particular dry blender, the powdered foaming agent such as sodium bicarbonate and then the added mixture further tumbled to provide a dispersion of sodium bicarbonate over a surface of the resin and because of the presence of the adhered aid, stratification of the resin of sodium bicarbonate does not occur under normal handling conditions. The dry blend of resin and foaming agent is then passed to an extruder where it is heat plastified, usually at a temperature of about 250° C., thoroughly mixed, cooled and extruded into a zone of lower pressure where it foams and cools to a self-supporting shape.

Generally, it is desirable to maintain the heat plastified foaming agent containing resinous composition under sufficient pressure that foaming is prevented until the heated mobile gel is exposed to atmospheric pressure. The preparation of foams such as foam plank is well known and is set forth in the following U.S. Pat. Nos.: 2,669,751; 2,740,157; 2,838,801; 3,751,377; 3,817,669; 3,954,929; 3,897,528; and 3,914,085; the preparation of foamed sheet by extrusion is disclosed in the following U.S. Pat. Nos.: 2,917,217; 3,151,192; 3,648,462; 3,311,681; 3,391,051; 3,560,600; the teachings of which are herewith incorporated by reference thereto. All molecular weights are determined by gel permeation chromatography.

The invention is further illustrated but not limited by the following examples.

Employing a ¾ inch extruder having a feed zone heated to a temperature of about 210° C., an intermediate zone heated to about 180° C., and a die heated to about 150° C., a first series of foam samples were produced utilizing a styrene-acrylic acid copolymer containing 8.0 weight percent acrylic acid and having a molecular weight of about 260,000 gram moles; varying quantities of sodium bicarbonate were employed as blowing agent and varying screw speeds were utilized.

A second series of samples were prepared using styrene-acrylic acid copolymer of about 8 weight percent acrylic acid, the remainder styrene and having a molecular weight of 210,000 gram moles. Die temperature, die pressure and screw speed were recorded; foam samples were gathered, aged in air for a period of about a week and the external skin removed prior to determining the foam density which is recorded in pounds per cubic foot. Cell size was measured using the procedure ASTM D 3576 and the percentage of open cells was determined by ASTM D 2856-A and the heat distortion temperature was determined by modified ASTM Test D 2126-75. This test employs a one hour exposure at each temperature and the heat distortion temperature is the maximum temperature giving a linear dimension change of less than two percent. The results are set forth in Table I wherein the following abbreviations are employed:

SAA: Styrene acrylic acid copolymer
pph: parts by weight per hundred parts of polymer
°C.: degrees Centigrade
rpm: revolutions per minute
pcf: pounds per cubic foot
mm: millimeters
Temp.: Temperature

TABLE I

PROPERTIES OF SAA COPOLYMER (8% AA) FOAMS EXPANDED WITH SODIUM BICARBONATE

| NaHCO$_3$ Level (pph) | Die Temp. (°C.) | Screw Speed (rpm) | Foam Density PCF Aged With Skin | Foam Density PCF Aged Skin Off | Cell Size (mm) | Open Cell (%) | Heat Distortion Temp. (°C.) |
|---|---|---|---|---|---|---|---|
| \multicolumn{8}{c}{260M M. W. SAA} |
| 2.33 | 145 | 40 | 8.89 | 7.90 | 0.81 | 52.7 | 109 |
| 4.66 | 145 | 20 | 4.23 | 3.72 | 0.92 | 30.1 | 109 |
| 9.32 | 150 | 30 | 3.39 | 2.09 | 0.47 | 0.94 | 103 |
| 13.98 | 150 | 40 | 2.64 | 1.58 | 0.37 | 0.51 | 110 |
| 18.64 | 150 | 40 | 2.30 | 1.50 | 0.53 | 46.3 | 109 |
| \multicolumn{8}{c}{210M M. W. SAA} |
| 2.33 | 150 | 40 | 5.87 | 3.53 | 0.74 | 32.4 | 121 |
| 4.66 | 150 | 30 | 3.66 | 3.05 | 0.56 | 9.6 | 109 |
| 6.99 | 155 | 30 | 3.08 | 1.90 | 0.50 | 30.9 | 115 |
| 9.32 | 150 | 30 | 2.79 | 2.40 | 0.51 | 4.4 | 109 |
| 13.98 | 145 | 40 | 2.56 | 2.01 | 0.27 | 8.0 | 109 |

For purposes of comparison a polystyrene having a weight average molecular weight of about 200,000 gram moles was treated in a generally similar manner. The results are set forth in Table II.

TABLE II

PROPERTIES OF POLYSTYRENE FOAMS EXPANDED WITH SODIUM BICARBONATE

| Level (pph) | Die Temp. (°C.) | Screw Speed (rpm) | Foam Density (pcf) Aged With Skin | Aged Skin Off | Cell Size (mm) | Open Cell (%) | Heat Distortion Temp. (°C.) |
|---|---|---|---|---|---|---|---|
| 2 | 135 | 40 | 8.06 | 6.94 | 0.81 | 49.5 | 96 |
| 5 | 133 | 40 | 7.79 | 6.69 | 0.41 | 69.3 | 92 |
| 7 | 121 | 40 | 6.00 | 5.33 | 0.43 | 54.7 | 92 |
| 10 | 115 | 40 | 4.81 | 4.62 | 0.45 | 67.0 | 92 |
| 15 | 115 | 40 | 5.78 | 5.09 | 0.48 | 72.5 | 89 |
| 20 | 115 | 40 | 5.71 | 5.26 | 0.43 | 70.4 | 89 |

Results show that a lower density foam having a substantially closed cell structure and a higher heat distortion temperature is achieved by expanding styrene/acrylic acid copolymer with sodium bicarbonate. On the other hand, polystyrene is not expanded to a low density foam by sodium bicarbonate and the polystyrene foam has a high open cell content over the entire range of sodium bicarbonate level.

A styrene-maleic anhydride copolymer containing about 20 percent maleic anhydride polymerized therein, with a solution viscosity of 5.6 centipoise at 25° C. in a 10 percent methylethylketone solution was foamed employing sodium bicarbonate as well as a styrene-acrylonitrile polymer which contained about 75 weight percent styrene with 25 weight percent acrylonitrile were foamed for comparative purposes. The styrene-maleic anhydride copolymer being designated by the abbreviations SMA and styrene-acrylonitrile polymer, by SAN. These styrene copolymers do not produce a low-density closed cell foam as shown in Table III. From the results, it appears that the response of the styrene-acrylic acid copolymer to the sodium bicarbonate blowing agent is unique.

varying levels of sodium bicarbonate. The results are set forth in Table IV.

TABLE IV
PROPERTIES OF SAA COPOLYMER FOAMS EXPANDED WITH F-11/NaHCO₃ BINARY BLOWING AGENTS

| F-11 Level (pph) | NaHCO₃ Level (pph) | Die Temp. (°C.) | Screw Speed (rpm) | Foam Density (pcf) Aged Skin Off | Cell Size (mm) | Open Cell (%) | Remarks |
|---|---|---|---|---|---|---|---|
| 8.2 | 0 | 160 | 60 | 3.23 | 0.81 | 47.6 | 0.5 pph talc was added |
| 8.2 | 0 | 158 | 60 | 2.89 | 0.74 | 57.1 | 1.0 pph talc was added |
| 8.2 | 1 | 155 | 40 | 2.21 | 0.90 | 5.0 | |
| 8.2 | 1 | 150 | 60 | 1.90 | 0.81 | 1.6 | |
| 8.2 | 2 | 140 | 40 | 1.56 | 0.40 | 3.8 | |
| 8.2 | 2 | 140 | 60 | 1.52 | 0.43 | 41.3 | |
| 8.2 | 3 | 135 | 40 | 1.89 | 0.56 | 40.6 | |
| 8.2 | 3 | 130 | 60 | 1.82 | 0.58 | 38.9 | |
| 8.2 | 4 | 130 | 40 | 1.52 | 0.51 | 2.8 | |
| 8.2 | 4 | 130 | 60 | 1.49 | 0.54 | 41.9 | |
| 8.2 | 5 | 125 | 40 | 1.49 | 0.39 | 4.7 | |
| 8.2 | 5 | 125 | 60 | 1.92 | 0.49 | 44.2 | |
| 8.2 | 6 | 125 | 40 | 1.62 | 0.34 | 0.2 | |
| 8.2 | 6 | 125 | 60 | 1.46 | 0.35 | 43.7 | |
| 17.8 | 0 | 160 | 40 | 1.52 | 0.62 | 5.7 | |
| 17.8 | 1 | 160 | 40 | 1.46 | 0.90 | 0 | |
| 17.8 | 2 | 134 | 60 | 1.22 | 0.43 | 7.9 | |
| 17.8 | 3 | 128 | 60 | 1.22 | 0.40 | 0.3 | |
| 17.8 | 4 | 120 | 60 | 1.36 | 0.35 | 3.1 | |
| 17.8 | 5 | 120 | 60 | 1.43 | 0.45 | 5.9 | |
| 17.8 | 6 | 116 | 80 | 0.88 | 0.25 | 1.0 | |

A similar experiment employing a volatile fluid foaming agent was performed for comparative purposes utilizing polystyrene and an 80/20 parts by weight mixture of trichlorofluoromethane/pentane with varying

TABLE III
PROPERTIES OF OTHER POLYMER FOAMS EXPANDED WITH SODIUM BICARBONATE

| Polymer Type | NaHCO₃ Level (pph) | Die Temp. (°C.) | Screw Speed (rpm) | Foam Density Fresh With Skin (pcf) | Cell Size (mm) | Open Cell (%) | Heat Distortion Temp. (°C.) |
|---|---|---|---|---|---|---|---|
| SMA | 14 | 190 | 40 | 6.24 | 0.59 | 79.1 | >125 |
| SAN | 14 | 150 | 40 | 31.2 | | | |

A series of extrusions were made using an 8 percent acrylic acid, 92 percent styrene copolymer having a molecular weight of about 210,000 gram moles and varying levels of trichlorofluoromethane (F-11) and levels of sodium bicarbonate. The results are set forth in Table V.

TABLE V
PROPERTIES OF POLYSTYRENE FOAM EXPANDED WITH COMBINED BLOWING AGENTS OF 80/20 F-11/PENTANE AND NaHCO₃

| F-11/Pentane Level (pph) | NaHCO₃ Level (pph) | Die Temp. (°C.) | Screw Speed (rpm) | Foam Density (pcf) Aged Skin Off | Cell Size (mm) | Open Cell (%) | Remarks |
|---|---|---|---|---|---|---|---|
| 9.8 | 0 | 110 | 40 | 3.31 | 0.56 | 3.1 | 1 pph talc was added |
| 9.8 | 0 | 110 | 60 | 2.83 | 0.48 | 0.8 | 1 pph talc was added |
| 9.8 | 0 | 110 | 80 | 2.67 | 0.68 | 0.1 | 1 pph talc was added |
| 9.8 | 1 | 110 | 40 | 2.64 | 0.74 | 0.2 | |
| 9.8 | 1 | 110 | 60 | 2.29 | 0.68 | 1.7 | |
| 9.8 | 1 | 110 | 80 | 2.52 | 0.65 | 0.2 | |
| 9.8 | 2 | 110 | 40 | 2.52 | 0.51 | 0 | |
| 9.8 | 2 | 110 | 60 | 2.21 | 0.58 | 7.3 | |
| 9.8 | 2 | 110 | 80 | 2.29 | 0.62 | 10.6 | |
| 9.8 | 3 | 110 | 40 | 2.22 | 0.51 | 0 | |
| 9.8 | 3 | 110 | 60 | 2.22 | 0.39 | 7.6 | |
| 9.8 | 3 | 110 | 80 | 2.52 | 0.48 | 0 | |
| 9.8 | 3 | 110 | 100 | 2.54 | 0.54 | 50.3 | |
| 9.8 | 4 | 110 | | (Frozen at the die) | | | |
| 9.8 | 5 | 125 | 40 | — | 0.60 | 80.8 | |
| 9.8 | 6 | 120 | 40 | 2.01 | 0.70 | 59.9 | |
| 9.8 | 6 | 120 | 60 | 1.82 | 0.58 | 49.9 | |
| 9.8 | 6 | 120 | 80 | 2.08 | 0.65 | 38.9 | |

A number of mixtures containing varying quantities of sodium methoxide and sodium bicarbonate were extruded to form foams with a copolymer of 8 weight percent acrylic acid and the remainder being styrene having a weight average molecular weight of about 210,000 gram moles. The results are set forth in Table VI.

TABLE VI

PROPERTIES OF SAA COPOLYMER FOAMS EXPANDED WITH NaOCH₃/NaHCO₃ MIXED BLOWING AGENTS

| NaOCH₃ Level (pph) | NaHCO₃ Level (pph) | Die Temp. (°C.) | Screw Speed (rpm) | Conversion To Salt (mole %) | Foam Density (pcf) Aged Skin Off | Cell Size (mm) | Open Cell (%) | Heat Distortion Temp. (°C.) |
|---|---|---|---|---|---|---|---|---|
| 3 | 0 | 155 | 40 | 46 | 2.32 | 1.81 | 0.5 | 115 |
| 1.5 | 4.66 | 160 | 40 | 43 | 1.98 | 0.63 | 0.8 | 115 |
| 1.5 | 6.99 | 155 | 40 | 68 | 2.28 | 0.45 | 0 | 115 |
| 1.0 | 6.99 | 155 | 60 | 51 | 1.86 | 0.54 | 2.4 | 115 |
| 0.6 | 6.99 | 160 | 40 | 48 | 1.73 | 0.48 | 0 | 115 |

A variety of other materials were extruded with a copolymer of 8 weight percent of acrylic acid and the remainder being styrene. The polymer had a molecular weight of about 210,000 gram moles. The results are set forth in Table VII.

TABLE VII

PROPERTIES OF SAA COPOLYMER FOAMS EXPANDED WITH OTHER METAL COMPOUNDS

| Compound Type | Level (pph) | F-11 Level (pph) | Die Temp. (°C.) | Screw Speed (rpm) | Conversion To Salt (mole %) | Foam Density (pcf) With Skin | Foam Density (pcf) Skin Off | Cell Size (mm) | Open Cell (%) | Heat Distortion Temp. (°C.) |
|---|---|---|---|---|---|---|---|---|---|---|
| Na₂CO₃ | 2 | | 180 | 30 | | 23.1 | | | | |
| | 5 | | 170 | 30 | | 16.8 | | 2.03 | 5.29 | |
| | 7 | | 165 | 30 | | 17.2 | | 1.62 | 52.3 | |
| | 9 | | 150 | 40 | 54 | 7.38 | | 0.63 | 54.0 | 115 |
| Na₂CO₃.H₂O | 2 | | 158 | 40 | | 11.6 | 13.7 | 1.35 | 67.6 | |
| | 5 | | 150 | 30 | | 4.77 | 3.28 | 1.01 | 53.5 | |
| | 7 | | 150 | 30 | | 3.60 | 2.78 | 0.81 | 6.2 | |
| | 9 | | 150 | 30 | | 3.10 | 2.28 | 0.54 | 2.8 | |
| ZnCO₃ | 2 | | 160 | 30 | | 34.6 | | | | |
| | 5 | | 160 | 30 | | 25.9 | | | | |
| | 7 | | 160 | 30 | | 24.8 | | | | |
| | 9 | | 160 | 30 | | 15.4 | | | | |
| | 12.66 | | 150 | 40 | 25 | 17.5 | | 0.54 | 29.4 | 113 |
| Zn(CH₃COO)₂.2H₂O | 3 | | 155 | 30 | 45 | 3.82 | | 1.35 | 31.8 | 108 |
| ZnO | 8.2 | | 160 | 40 | | 61.8 | | | | |
| CaCO₃ | 10 | | 190 | 40 | | 52.6 | | | | |
| | 20 | | 210 | 30 | | 57.4 | | | | |
| Talc | 0.5 | 7.5 | 135 | 40 | | 5.03 | 3.81 | 0.49 | 44.5 | |
| Na₂CO₃ | 7.5 | 7.5 | 135 | 40 | | 3.71 | 2.52 | 0.26 | 0.8 | |
| Na₂CO₃.H₂O | 7 | 7.5 | 135 | 40 | | 2.45 | 1.66 | 0.77 | 0 | |
| ZnCO₃ | 7 | 7.5 | 135 | 40 | | 4.11 | 3.27 | 0.81 | 46.0 | |

Note that of the sodium carbonate, sodium carbonate monohydrate and zinc carbonate, sodium carbonate and sodium carbonate monohydrate gave satisfactory foams while with the addition of 7.5 parts per hundred of trichlorofluoromethane, all three compounds work as an effective secondary blowing agent.

A series of extrusions were performed employing styrene-acrylic acid copolymers of varying acrylic acid content and varying sodium bicarbonate content. The results are set forth in Table VIII which establishes that good foams of low density and reasonable open cell content can be obtained over a wide range of compositions.

TABLE VIII

EFFECT OF ACRYLIC ACID LEVEL ON THE PROCESSABILITY AND PROPERTIES OF COPOLYMER FOAMS EXPANDED WITH NaHCO₃

| NaHCO₃ Level (pph) | Die Temp. (°C.) | Screw Speed (rpm) | Foam Density (pcf) Aged With Skin | Foam Density (pcf) Aged Skin Off | Cell Size (mm) | Open Cell (%) | Heat Distortion Temp. (°C.) |
|---|---|---|---|---|---|---|---|
| 5% AA SAA Copolymer | | | | | | | |
| 2 | 150 | 30 | 6.93 | 4.62 | 0.68 | 60.8 | 113 |
| 5 | 145 | 20 | 4.52 | 3.66 | 0.58 | 5.6 | 107 |
| 10 | 145 | 20 | 3.78 | 2.40 | 0.54 | 5.9 | 107 |
| 15 | 145 | 25 | 3.74 | 2.40 | 0.37 | 6.5 | 106 |
| 10% AA SAA Copolymer | | | | | | | |
| 2 | 148 | 30 | 6.67 | 4.74 | 0.65 | 37.8 | 118 |
| 5 | 145 | 30 | 3.70 | 3.09 | 0.60 | 15.7 | 118 |
| 10 | 147 | 30 | 3.74 | 2.92 | 0.49 | 2.9 | 113 |
| 15 | 148 | 30 | 4.16 | 2.83 | 0.40 | 3.1 | 113 |
| 15% AA SAA Copolymer | | | | | | | |
| 2 | 150 | 30 | 5.88 | 4.23 | 0.77 | 28.8 | 124 |
| 5 | 150 | 30 | 4.17 | 2.61 | 0.62 | 23.4 | 121 |
| 10 | 150 | 30 | 3.57 | 2.01 | 0.40 | 4.5 | 124 |
| 15 | 152 | 30 | 4.31 | 3.21 | 0.30 | 1.0 | 124 |
| 20% AA SAA Copolymer | | | | | | | |
| 2 | 170 | 30 | 3.67 | 2.63 | 0.81 | 4.7 | 133 |
| 5 | 170 | 30 | 3.28 | 2.40 | 0.68 | 5.6 | 133 |
| 10 | 170 | 30 | 2.93 | 2.01 | 0.51 | 6.4 | 135 |
| 15 | 170 | 30 | 2.30 | 2.01 | 0.40 | 7.9 | 133 |

A 8 weight percent acrylic acid styrene copolymer was foamed under a variety of conditions and ammonium bicarbonate levels with trichlorofluoromethane and ethyl chloride. The results are set forth in Table IX, from which it can be seen that very little bicarbonate is equivalent to a substantial quantity of the volatile fluid foaming agent.

TABLE IX
PROPERTIES OF SAA COPOLYMER FOAMS EXPANDED WITH AMMONIUM BICARBONATE AND MIXTURES WITH PHYSICAL BLOWING AGENTS

| Physical Blowing Agent | | NH$_4$HCO$_3$ Level | Die Temp. | Screw Speed | Foam Density (pcf) | | Cell Size | Open Cell |
|---|---|---|---|---|---|---|---|---|
| (Type) | (pph) | (pph) | (°C.) | (rpm) | With Skin | Skin Off | (mm) | (%) |
| ¾" Extruder | | | | | | | | |
| None | | 2 | 150 | 40 | 8.35 | | 2.70 | 66.8 |
| | | 5 | 145 | 20 | 4.46 | | 3.24 | 71.6 |
| | | 7 | 150 | 20 | 5.12 | | 3.24 | 62.4 |
| F-11 | 7.5 | 0 | 135 | 40 | 9.78 | 4.23 | 1.36 | 10.2 |
| | 7.5 | 0 | 135 | 40 | 5.14 | 3.24 | 0.6 | 62.6* |
| | 7.5 | 1 | 135 | 40 | 3.21 | 2.13 | 1.35 | 6.2 |
| | 7.5 | 2 | 135 | 40 | 2.52 | 1.79 | 1.47 | 3.0 |
| | 7.5 | 3 | 135 | 40 | 2.36 | 1.36 | 1.35 | 17.5 |
| | 16.1 | 0 | 140 | 40 | 3.07 | 2.00 | 2.31 | 3.7 |
| | 16.1 | 1 | 135 | 40 | 2.24 | 1.92 | 1.01 | 2.9 |
| | 16.1 | 2 | 135 | 40 | 1.93 | 1.59 | 0.71 | 0 |
| | 16.1 | 5 | 135 | 40 | (Collapsed due to over expansion) | | | |
| 1¼" Extruder | | | | | | | | |
| C$_2$H$_5$Cl | 8.2 | 0 | 142.5 | | 4.21 | 2.75 | 4.05 | 0 |
| | 8.3 | 1 | 142.5 | | 2.96 | 2.33 | 1.08 | 0.5 |
| | 8.3 | 2 | 142.5 | | 3.12 | 2.03 | 1.47 | 0 |
| | 8.3 | 4 | 143 | | 2.64 | 1.56 | 1.80 | 1.7 |
| | 13.0 | 0 | 142 | | 1.98 | 1.73 | 2.70 | 10.3 |

*0.5 pph talc was added for cell size control.

In a manner similar to the foregoing illustration, varying quantities of hydrated magnesium carbonate were evaluated alone and in combination with trichlorofluoromethane, (8 weight percent acrylic acid resin, the remaining being styrene). The results are set forth in Table X.

TABLE X
PROPERTIES OF SAA COPOLYMER FOAMS EXPANDED WITH MAGNESIUM CARBONATE AND ITS MIXTURES WITH F-11

| F-11 Level (pph) | Magnesium Carbonate (pph) | Die Temp. (°C.) | Screw Speed (rpm) | Foam Density (pcf) | | Cell Size (mm) | Open Cell (%) |
|---|---|---|---|---|---|---|---|
| | | | | With Skin | Skin Off | | |
| | 2 | 165 | 30 | 21.5 | 15.1 | 0.51 | 5.8 |
| | 5 | 160 | 30 | 14.6 | 13.4 | 0.58 | 38.5 |
| | 7 | 155 | 30 | 11.6 | 10.8 | 0.54 | 47.7 |
| | 10 | 150 | 30 | 9.93 | 8.76 | 0.49 | 45.3 |
| 8.0 | 0 | 150 | 40 | 3.66 | 3.21 | 0.46 | 47.0* |
| 8.0 | 1 | 145 | 40 | 3.46 | 2.75 | 0.54 | 41.8 |
| 8.0 | 2 | 135 | 40 | 3.19 | 2.59 | 0.58 | 56.1 |
| 8.0 | 3 | 130 | 60 | 3.21 | 2.40 | 0.54 | 60.5 |
| 8.0 | 4 | 130 | 40 | 3.53 | 2.86 | 0.49 | 46.2 |
| 8.0 | 5 | 130 | 40 | 3.46 | 2.77 | 0.58 | 37.2 |

TABLE X-continued
PROPERTIES OF SAA COPOLYMER FOAMS EXPANDED WITH MAGNESIUM CARBONATE AND ITS MIXTURES WITH F-11

| F-11 Level (pph) | Magnesium Carbonate (pph) | Die Temp. (°C.) | Screw Speed (rpm) | Foam Density (pcf) | | Cell Size (mm) | Open Cell (%) |
|---|---|---|---|---|---|---|---|
| | | | | With Skin | Skin Off | | |
| 8.0 | 6 | 128 | 60 | 3.09 | 2.30 | 0.60 | 50.2 |

*1 pph talc was added for cell size control.

Foamed sheet was prepared using a one-inch extruder and tubing die wherein the tube was inflated with air to provide a foamed sheet of a desired thickness. The die diameter was 1¼ inches and the die gap was 0.025 inch. The blowing agent used was varying amounts of sodium bicarbonate. The copolymer employed was of styrene and acrylic acid which contained about 8 weight percent acrylic acid, the remainder being styrene. The polymer was extruded at about nine pounds per hour. The screw speed and temperatures were adjusted for optimum results. The results are set forth in Table XI.

TABLE XI
PROPERTIES SAA FOAM SHEET PREPARED ON A ONE INCH BLOWN FILM LINE USING SODIUM BICARBONATE AS THE BLOWING AGENT

| NaHCO$_3$ Level (pph) | Gel Temp. (%) | Screw Speed (rpm) | Foam width (in) | Thickness (in) | Foam Density (pcf) | Foam Cell Size (mm) | Open Cell (%) | Tensile Str. (M psi) | | Percent Elongation | |
|---|---|---|---|---|---|---|---|---|---|---|---|
| | | | | | | | | (MD) | (CD) | (MD) | (CD) |
| 1.0 | 203 | 28 | 15.2 | 0.023 | 9.15 | 0.81 | 7.8 | 2.02 | 5.68 | 4.68 | 1.54 |
| 2.0 | 203 | 30 | 8.4 | 0.034 | 12.2 | 1.16 | 17.6 | 7.43 | 4.17 | 1.67 | 1.51 |
| 3.0 | 210 | 44 | 7.4 | 0.030 | 6.85 | 0.68 | 24.5 | 6.48 | 4.58 | 2.01 | 1.70 |
| 4.0 | 213 | 48 | 10.5 | 0.053 | 8.29 | 0.95 | 29.7 | 3.63 | 3.88 | 1.88 | 2.46 |
| 5.0 | 209 | 48 | 11.5 | 0.027 | 7.56 | 0.90 | 31.2 | 8.17 | 4.31 | 3.21 | 3.27 |
| 7.0 | 213 | 60 | 8.6 | 0.036 | 6.11 | 0.81 | 51.1 | 4.45 | 1.56 | 1.68 | 3.36 |

Notes:
MD stands for machine direction and CD for cross direction.

Employing the apparatus of the previous illustration, foam was prepared from a copolymer of 92 weight percent vinyl toluene and 8 weight percent acrylic acid. The vinyl toluene was about 60 weight percent metaisomer and 40 weight percent para-isomer. That polymer had a molecular weight of about 180,000 gram moles; 7 parts by weight of sodium bicarbonate were employed as blowing agent to 100 parts by weight of the resin. The die temperature was 150° C., screw speed was 30 revolutions per minute. The resultant foam had a density of 4.54 pounds per cubic foot; the cell size was about 0.45 millimeters and was 21.2 percent open cell. For a comparison, a homopolymer of paravinyl toluene having a molecular weight of about 300,000 gram moles was similarly treated. The foam with skin had a density of 6.11 pounds per cubic foot; cell size of 0.62 millimeters, and was 37.8 percent open cell.

In a manner similar to the foregoing illustrations, other foams are readily prepared employing sodium bicarbonate, hydrated magnesium carbonate, zinc diacetate monohydrate alone or in combination with a volatile fluid foaming agent to prepare foam plank or foam sheet when the hereinbefore described styrene-acrylic acid, styrene-methacrylic acid or styrene-itaconic acid vinyl toluene acrylic acid copolymers are utilized.

What is claimed is:

1. A method for the preparation of an improved, alkenyl aromatic polymer foam, the method consisting essentially of intimately admixing a polymer having a weight average molecular weight of from about 100,000 to about 350,000 gram moles, the polymer having polymerized therein from about 99 to 70 parts by weight of alkenyl aromatic monomer and from about 1 to 30 parts by weight of an olefinically unsaturated acid selected from the group consisting of acrylic acid, methacrylic acid, itaconic acid and mixtures thereof with a blowing agent which is a carbonate, carbonate hydrate or bicarbonate of an ion selected from the group consisting of sodium, magnesium, zinc, ammonium and mixtures thereof, the carbonate, carbonate hydrate or bicarbonate being present in the proportion of from about 0.5 to 20 parts by weight per hundred parts by weight of polymer, heat plastifying the polymer under a pressure sufficient to prevent foaming and a temperature sufficiently high to decompose the carbonate, carbonate hydrate or bicarbonate under a pressure sufficient to prevent foaming, subsequently passing the heat plastified polymer to a zone of lower pressure to thereby obtain a polymeric foam having a density of from about 0.5 to 8 pounds per cubic foot having a cell size of from about 0.1 to 5 millimeters.

2. The method of claim 1 wherein the alkenyl aromatic monomer is styrene.

3. The method of claim 1 wherein the alkenyl aromatic monomer is vinyl toluene.

* * * * *